June 16, 1931. J. H. RITTER ET AL 1,810,295

ELECTROCHEMICAL CONVERTER

Filed Nov. 22, 1928

INVENTORS
John J. Ritter
John H. Ritter

Harry Bowen
ATTORNEY

Patented June 16, 1931

1,810,295

UNITED STATES PATENT OFFICE

JOHN H. RITTER AND JOHN J. RITTER, OF SEATTLE, WASHINGTON

ELECTROCHEMICAL CONVERTER

Application filed November 22, 1928. Serial No. 321,183.

The invention is a device that may be installed between a source of electric current and an apparatus using the current which will change or convert the current so that it its adaptable to be used by or to operate the said apparatus.

The invention may also be defined as a means for modifying, converting or controlling the voltage or potential contour of electric currents.

The invention may also be defined as transitory accumulative secondary batteries connected across the conductors supplying current from a suitable source to an apparatus to be operated by the current.

The invention may also be termed a converter of electrical potential contour having an electrolytic apparatus arranged to serve the purpose of a low impedance device of a high or practically infinite resistance to direct currents.

And the invention is also a plurality of electrolytic cells having electrodes made of hard metal, such as steel, and immersed in a caustic alkali, such as a solution containing twenty-five percent of potassium hydrate and the balance of water in which groups of the cells are connected across the conduits of a circuit between a source of electric current and an apparatus, such as a radio, for which the current is to be used, the cells being in combination with a suitable transforming and rectifying unit, a variable resistance and choke coils.

The object of the invention is to provide means for changing the amplitude of an electric current so that it will operate an apparatus, such as a radio, with the highest degree of efficiency and in which the said changing means is so constructed that the mechanical action therein is negligible so that the life of the device is indefinite.

The object of the invention may also be described as a simple and efficient means for controlling, modifying and converting the voltage or potential contour of currents, as from alternating to direct current, or pulsating to direct current, which will also function as an energy reciprocator for controlling electrokinetics and electrodynamics.

Another object of the invention is to provide an art or process for controlling and converting the voltage or potential contour of currents, as from alternating to constant direct, or pulsating direct to constant direct; and for replacing motor-generators and also primary and secondary storage batteries where a constant source of current is available and storage is not necessary.

Another object of the invetnion is to provide a device to act as an energy reciprocator between and during moments of variation.

Another object of the invention is to stabilize current flow.

Another object is to provide a temporary accumulator of reserve energy for transitory demands of short durations for counteracting reactance.

Another object is to absorb electric energy, stored in magnetic fields, which, when released upon circuit interruptions, shortens the time period of cessation of current flow and eliminates sparking in the interrupted circuit.

Another object is to provide carrier-agents in transitory transmission of electric current, whereby said agents serve as a medium for transmitting current between divided circuits and convert kinetic electric energy completely into static electric energy, thus providing non-reactant sources of electric energy to the output.

And a further object is to provide a plurality of transitory-accumulative secondary batteries serving as mediums for changing the potential contour of the output as compared with the input circuits in direct transmission.

With these ends in view the invention embodies a plurality of cells arranged in groups in which the electrodes are made of hard metal, such as steel, and immersed in a caustic alkali, such as a twenty-five percent solution of potassium hydrate and the balance of water, and the cells are arranged in groups and connected across the conductors supplying pulsating current from a constant source to an apparatus, such as a radio, with suitable transforming and rectifying units, variable resistances and choke coils. The electrodes are immersed in the solution and their upper ends are covered with a heavy film of paraffine oil which is placed on top of the solution thereby preventing chemical and physical action on the electrodes which may tend to cause mechanical and chemical changes of disintegration, corrosion and creeping of salts.

Other features and advantages of the invention will appear from the following description taken in connection with the drawings, wherein.

Figure 1:
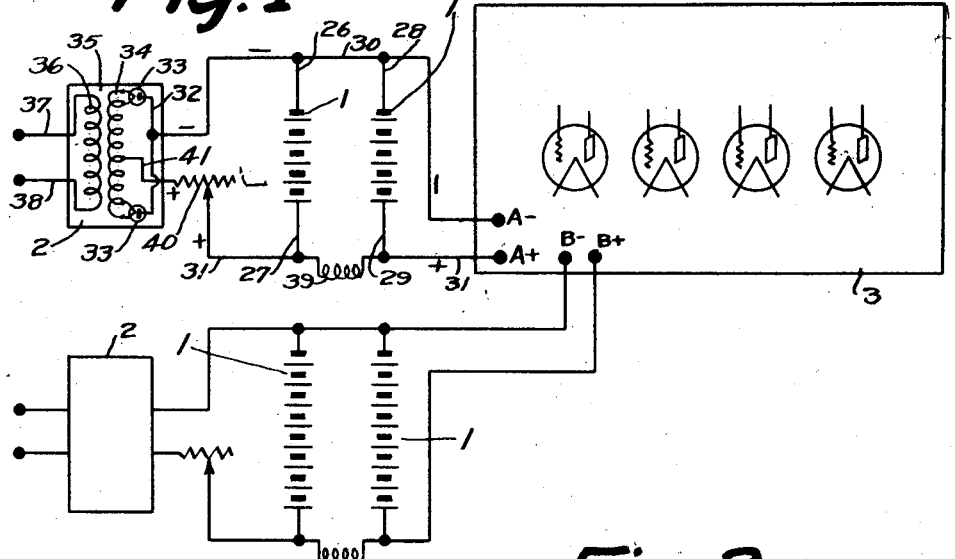
Figure 1 is a view showing a hookup from a source of electric current to a radio with the device installed between the source and the radio to replace the batteries.

In the drawings the device is shown as it would be made, wherein numeral 1 indicates the batteries, numeral 2 the transformer and rectifier unit, and numeral 3 a radio in combination with which the device may be used.

Figure 2:
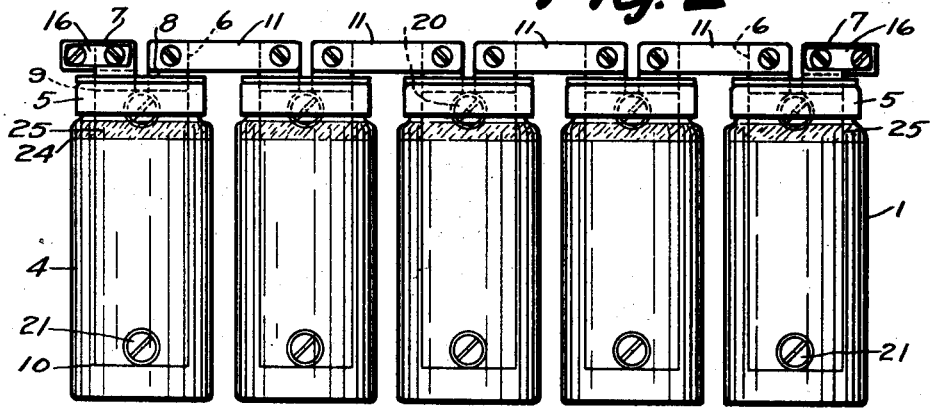
Figure 2 is a view of a side elevation of a battery of cells.
Figure 3:
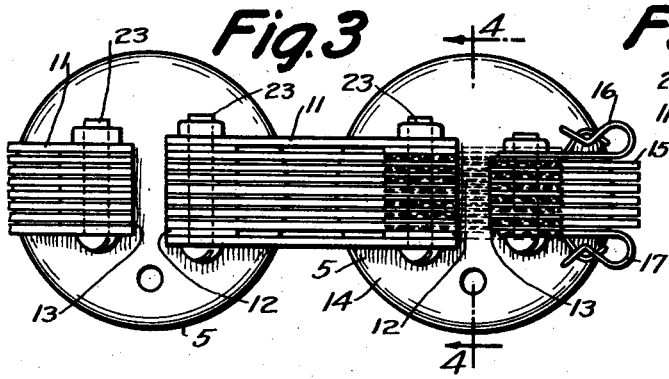
Figure 3 is a plan view of a part of the cells showing the connections at the upper ends of the electrodes and the meshing of the lugs of the plates through connectors.
Figures 4, 5:
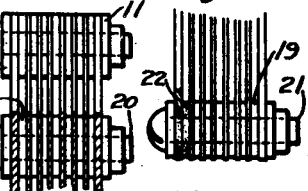
Figure 4 is a sectional view on line 4—4 of Figure 3 showing the connection at the upper ends of the electrodes with the cell omitted.
Figure 5 is a cross section through the lower end of the electrodes showing the insulators.

The battery 1 is made with a plurality of cells which are made with glass jars 4 as shown in Figure 2, having covers 5 and a plurality of positive and negative electrodes 6 and 7. The electrodes are made of flat steel plates which are of a rectangular shape and which are provided with ears 8 which extend upward from the point 9 which forms the upper ends of the electrodes. The electrodes extend downward from the point 9 to the point 10 which is a short distance from the lower end of the cells and the electrodes are arranged so that the ears of every other plate will be located on one side and the ears of the other set of plates on the opposite side. One set of plates is connected to a similar set of plates in an adjoining cell with a plurality of bars 11 which may be termed conductors and it will be observed that the cells are arranged so that with one set of plates connected to a similar set in an adjoining cell the other set of electrodes will also be connected to a similar set of electrodes in an adjoining cell on the opposite side. In Figure 3 two of the cells are shown, and for the purpose of illustrating, one set of plates, which is provided with heavy plates on the outside, will be indicated by the numeral 12, and the set of intermediate plates alternating with the said former set of plates and spaced between them and also in which the heavy plates at the sides are eliminated, will be indicated by the numeral 13, so that it may readily be observed that the set of plates as indicated by the numeral 12 is connected to a similar set which is also indicated by the numeral 12 in an adjoining cell, and the intermediate set 13 is connected to the similar intermediate set of an adjoining cell which is not shown. The intermediate set of the cell, which for the purpose of illustrating, will be indicated by the numeral 14 and which is shown as the end cell, is provided with short bars 15 with spring clips 16 and 17 at the sides to which the wires of the circuit may be connected. The cells are arranged in batteries of any required number of cells. It will also be observed that with the plates arranged in this manner the connectors will be so positioned that the ears of the plates will mesh through the connectors which will make it possible to connect the ears with a plurality of parallel connectors with a connector between the ear of each plate as shown in Figure 3. The plates or electrodes are shown in dotted lines in the cell indicated by the numeral 14 so that it may readily be observed that the plates of one set are positioned between the plates of the other set and separated therefrom by insulating washers 18 at the upper end and 19 at the lower end. These plates are held together by bolts passing through them and through the insulators; and the bolts at the upper end are indicated by the numeral 20 and those at the lower end by the numeral 21. These bolts do not engage the plates as the insulating washers are provided with shoulders 22 which pass through openings in the plates as shown in Figure 5. It will be understood that although the electrodes are shown and described as being of this design and arranged in this manner, they may be of any other design and may be arranged in any other suitable manner. In the design shown the connectors are directly held to the ears by bolts 23, however, it will be understood that they may be held in any other suitable manner.

The cells are filled with a caustic alkali solution, such as a twenty-five percent solution of potassium hydrate and water, to the point 24 and a heavy layer of paraffine oil, as indicated by the numeral 25 and shown in Figure 2, is placed on top of the solution to completely protect and seal the upper ends of the plates and cells. It is understood, however, that any other suitable means may be used for protecting and sealing the upper ends of the cell.

In the diagram shown in Figure 1 two batteries of five cells each are shown in the upper part of the diagram, as indicated by the numeral 1, which are connected by wires 26, 27, 28 and 29 to the conductors 30 and 31 as shown. The conductor 30 is shown as indicating the negative pole of the battery and the conductor 31 as indicating the positive pole. It will be observed that the conductor 30 is connected by a wire 32 to rectifiers 33 and the rectifiers are connected to the secondary coil 34 of a transformer 35. The primary coil 36 of the transformer is connected by wires 37 and 38 to an electric light plug or any suitable source of electric current. The conductor 31 is provided with a choke coil 39 between the batteries and a rheostat or variable resistor 40 between the batteries and transformer. The rheostat 40 being connected by a wire 41 to the secondary coil 34 of the transformer. This apparatus as shown and described is arranged to replace the A battery of the radio 3 and it will be observed that a similar apparatus, which is also shown may be used to replace the B battery by increasing the number of cells, to obtain the required voltage, and using a suitable transformer.

The number of cells used in either case are proportionate to the voltage required and the number of plates or surface areas in the cells are proportionate to the amperage required.

It is understood that although this device is illustrated as being connected to a radio it may also be used for many other purposes. One of the most important being the prevention of sparks, particularly on trolley lines, switches or the like, in which the cells are connected in shunt to the output of a D. C. generator, such as rectifiers or motor generators in which the batteries serve as a bypass for high potentials generated. The device may also be attached to the output of a DC generator for any other stabilizing purpose.

This type of converter is designed to operate continuously in conjunction with a source of current for converting the potential contours of the current, if undulating, into constant potential, or which may lengthen or shorten the intervals of the pulsations of fluctuations of the backward and forward movement of the current.

This action involved in a battery of this nature may be described as a transitory absorption and disbursement of current as the current is taken in, held for a fraction of a second and then given out, and during this action the current is changed, transformed or converted into current of such a quality that with this device used in combination with the transformer and rectifying unit, rheostat and choke coil it is adaptable for use and will function with the greatest degree of efficiency in a radio or the like.

The battery itself is designed so that physical or chemical changes of the electrode structure or composition will not occur. Also that the opposing E. M. F. of polarization can attain an equilibrium with any applied potential within the limits of surface tension of the solution, which is the critical voltage point where gases appear. The nature of the electrode element and electrolyte to a certain degree determines the maximum E. M. F. of polarization; and the highest efficiency of energy reciprocation is determined by the maximum E. M. F. of polarization per cell with the least internal resistance. This device therefore functions with the highest degree of efficiency for a transitory, accumulative device where storage is not essential.

The device is not similar to a storage battery, as in a storage battery there is diffusion through the plates which absorb and give up gases, and the hydrogen and oxygen leave the solution to react with the powders in the plates, whereas there is no diffusion in the plates of this battery as they do not absorb or give up gases and the hydrogen and oxygen therefore never leaves the solution. This reaction of the gases in the nascent state with the plates of a storage battery makes it possible for them to take a charge, hold a charge for a considerable time, and become overcharged or overdischarged, whereas this battery will not take a permanent charge. Storage batteries are therefore dependent on changes in the plates and solution, the plates often becoming very much distorted in use, whereas there is no change whatever in the formation of the plates or in the solution of this device.

It will be understood that other changes may be made in the construction without departing from the spirit of the invention, one of which changes may be in the use of any number of cells in a battery or of any number of batteries in a hookup as shown in Figure 1 of the drawings. This type of battery may also be used in combination with transformers or rectifiers of any other type and may be used in combination with transformers, rectifiers, rheostats and choke coils in any other arrangement. The battery may also be used in combination with any other suitable device where it may be connected across the current supplying conductors.

The construction will be readily understood from the foregoing description. In use the device may be installed as shown in the upper part of the diagram shown in Figure 1 with the wires 37 and 38 connected to an electric light plug and the wires 30 and 31 connected to the negative and positive A battery terminals of a radio and any type of B battery may be used. A similar device with additional cells in the battery to compensate for the voltage of the B battery and a suitable transformer may also be used to replace the B battery as shown. When used in this manner the device will convert the pulsations of the electric current passing through the conductors and supplying current to the radio set which will make it possible for the set to function with the highest degree of efficiency, eliminating static and other noise picked up by the light wires and producing clear, smooth and distinct tones. The device may also be used with the same degree of efficiency for many other purposes.

Having thus fully described the invention what we claim as new and desire to secure by Letters Patent, is:

In a device of the character described, a plurality of cells forming a battery, a plurality of electrodes arranged in sets in the said cells, with the electrodes of one set alternating with the electrodes of the other and insulated therefrom, ears of the plates extending upward through the battery top, and suitable connectors for connecting the ears of the electrodes of one cell with the ears of similar electrodes in an adjoining cell, said electrodes being so arranged that the connectors will mesh externally with the ears of the plates of the respective cells.

In testimony whereof we affix our signatures.

JOHN J. RITTER.
JOHN H. RITTER.